United States Patent [19]
Schwartz

[11] Patent Number: 6,021,584
[45] Date of Patent: Feb. 8, 2000

[54] BLOWER ATTACHMENT

[76] Inventor: Richard Harry Schwartz, 2622 Fox Chase Ct., Bridgeville, Pa. 15017

[21] Appl. No.: 09/054,903

[22] Filed: Apr. 3, 1998

[51] Int. Cl.[7] .................................................. F26B 19/00
[52] U.S. Cl. ............................................................. 34/666
[58] Field of Search .................................... 34/72, 90, 91, 34/97, 95.2, 103, 104, 666; 239/273, 304, 549; 15/97.3, 104.92, 312.2

[56] References Cited

U.S. PATENT DOCUMENTS

| | | | |
|---|---|---|---|
| D. 308,123 | 5/1990 | Belanger . | |
| D. 315,232 | 3/1991 | Belanger . | |
| 3,229,703 | 1/1966 | Thompson et al. | 34/666 X |
| 3,994,041 | 11/1976 | Barber . | |
| 4,366,368 | 12/1982 | Stephens, III | 34/666 X |
| 4,651,442 | 3/1987 | McIntyre | 34/666 X |
| 4,848,670 | 7/1989 | Belanger . | |
| 4,979,316 | 12/1990 | Belanger . | |
| 5,251,281 | 10/1993 | Fravel, Jr. . | |
| 5,440,781 | 8/1995 | Kitazawa . | |
| 5,535,475 | 7/1996 | Sauter | 34/666 X |

*Primary Examiner*—Henry Bennett
*Assistant Examiner*—Steve Gravini

[57] ABSTRACT

A nozzle, for use with a power air blower or the like, to direct a high velocity sheet of air onto a surface, such as that of a motor vehicle's body, in order to displace water or other loose matter from the surface. The nozzle includes a longitudinal air outlet gap which produces a high velocity sheet of air to be directed by the operator onto a surface, in order to displace water or other loose matter therefrom.

6 Claims, 2 Drawing Sheets

BLOWER ATTACHMENT

BACKGROUND

1. Field of Invention

This invention relates generally to power air blower nozzles, and more particularly, to a hand held nozzle, for use with an air blower, for directing a high velocity sheet of air onto a surface, such as that of a motor vehicle's body, in order to displace water or other loose matter from the surface.

2. Description of Prior Art

In the case of a motor vehicle, after washing the vehicle for example, it is necessary to proactively dry the finish of the vehicle to avoid visible water spots which would be a result of allowing the water to evaporate from the vehicle's finish. If allowed to occur, these water spots will, at the very least, keep the freshly washed vehicle from looking clean. In more severe cases, contaminants in the water may actually cause the vehicle's finish to be damaged, requiring costly repairs ranging from buffing the finish to actual repainting.

The most common method for removing water from a vehicle's surface after hand washing is to hand dry the surface with a towel or other cloth. This method requires that the user pass the towel or cloth over the vehicle's surface in such a manner that the towel or cloth stays in contact with the surface so as to both displace and absorb the water from the surface during the motion. When the towel or cloth becomes saturated with water, the user must pause to wring the water from the towel or cloth, usually by twisting the towel or cloth with his/her hands. Once the towel or cloth has become saturated the first time, more pauses are required to wring the water from the towel or cloth as it becomes saturated more quickly than when it was dry, making the process of drying the surface very time consuming. Additionally, since moisture remains in the towel or cloth even after the wringing, the towel or cloth is likely to leave "streaks" of water on the vehicle's finish after the initial saturation.

Another method of hand drying is by using a chamois. While a chamois is, by definition, a piece of soft leather, for simplicity I will use the term chamois to also encompass the sections of man made material that are marketed as substitutes for genuine chamios'. The chamois is used in the same manner as a towel or cloth. Many people choose to use a chamois to dry their vehicle because chamois' are normally very soft and, therefore, perceived to be gentle to the vehicle's finish. Additionally, a chamois absorbent properties help to reduce the amount of streaking on the vehicle's finish, compared to that which occurs with towels and cloths. However, these same absorbent properties also make it more difficult to wring the water from a chamois than from a towel or cloth because the chamois tends to hold the water in. Chamois' can also be difficult to work with as they have a tendency to "roll" during the wiping process, requiring the user to pause from drying in order to unroll the chamois.

Any hand drying, no matter what the material used, also carries with it the danger of damaging the vehicle's finish during the wiping process. This can be caused by wiping any grit or dirt that might be on the vehicle's surface, or on the towel, cloth or chamois, across the finish thereby scratching the finish. For this reason, care must be taken to ensure that the vehicle's surface is thoroughly clean prior to beginning to hand dry. Also, it is important that the towel, cloth or chamois is not dropped onto the ground as it may pick up dirt or grit from the ground which could then scratch the vehicle's finish.

Another method of drying a vehicle is by blowing air across the vehicle in order to displace the water from the vehicle's surface, thereby drying the surface. This method is used by most automatic car washes to dry a vehicle after it has passed through the washing apparatus. In this case, the vehicle passes through a sheet of high velocity air directed at an angle toward the surface of the vehicle. The angle is such that the water is displaced from one end of the vehicle to the other and then off the end of the vehicle. This works well in most cases, however, because the contours of vehicles' surfaces are not all alike, a standardized blower designed to work on all vehicles is not optimum for all vehicles and, therefore, requires that the vehicle be hand dried after passing through the drying apparatus. While this is basically an effective means of drying a vehicle, it is only available at automatic car washes, and many people do not like to take their vehicles through automatic car washes for fear of the vehicle being damaged by the cleaning and/or drying apparatus.

At this point in time, there is no effective hand held method for displacing water from a vehicle's surface using forced air. While many conventional blowers, leaf blowers and the like, expel air at high velocities, present nozzles do not provide a wide, controllable pattern of air, leaving them inefficient for displacing water from a large surface. Also, the air outlet of most nozzles is located at the end of the nozzle making it inconvenient to clear a surface which is not situated below the user.

Accordingly, there has been a need for a means to thoroughly dry a surface quickly and conveniently, without causing any damage to the finish and without leaving streaks on the finish. The present invention fulfills this need.

SUMMARY OF THE INVENTION

The present invention provides an apparatus and method for displacing water or other loose matter from a surface by directing a sheet of air onto the surface to be cleared, delivered through a tubular nozzle, with a longitudinal air outlet gap along one side of the nozzle, connected to a power air blower. With this invention, a power air blower, which is readily available to much of the general public, may be utilized so that a surface can be cleared of water or other loose matter without the use of a towel, cloth, chamois or the like, and without any material coming in contact with the surface.

In accordance with the invention, air flows from the air blower through a hose into the nozzle, or directly from the blower output into the nozzle, thereby creating a positive pressure within the hollow nozzle. Once the nozzle has become pressurized, the air is forced out evenly through the longitudinal outlet gap at a high velocity onto the surface to be cleared. The velocity of the air is such that the surface is blown clear of the water or other loose matter without the need for any object to come in contact with the surface being cleared.

It will be appreciated from the foregoing that the present invention represents an advance in the practical utilization of air blowers. With this blower nozzle, surfaces may be cleared of water or other loose matter without danger of damaging the finish, without leaving streaking, and without the need to take time to wring the water from a towel, cloth, chamois or the like.

These and other features and advantages of the present invention will become apparent from the following more detailed description, taken in conjunction with the accompanying drawings, which illustrate the principles of the invention.

DRAWING FIGURES

The accompanying drawings illustrate embodiments of the invention. In such drawings.

REFERENCE NUMERALS IN DRAWINGS

| | |
|---|---|
| 10 blower nozzle | 12 air outlet gap |
| 14 air blower | 16 surface |
| 18 air input flange | |

DESCRIPTION OF THE DRAWINGS AND OPERATION OF THE INVENTION

Figure 1:
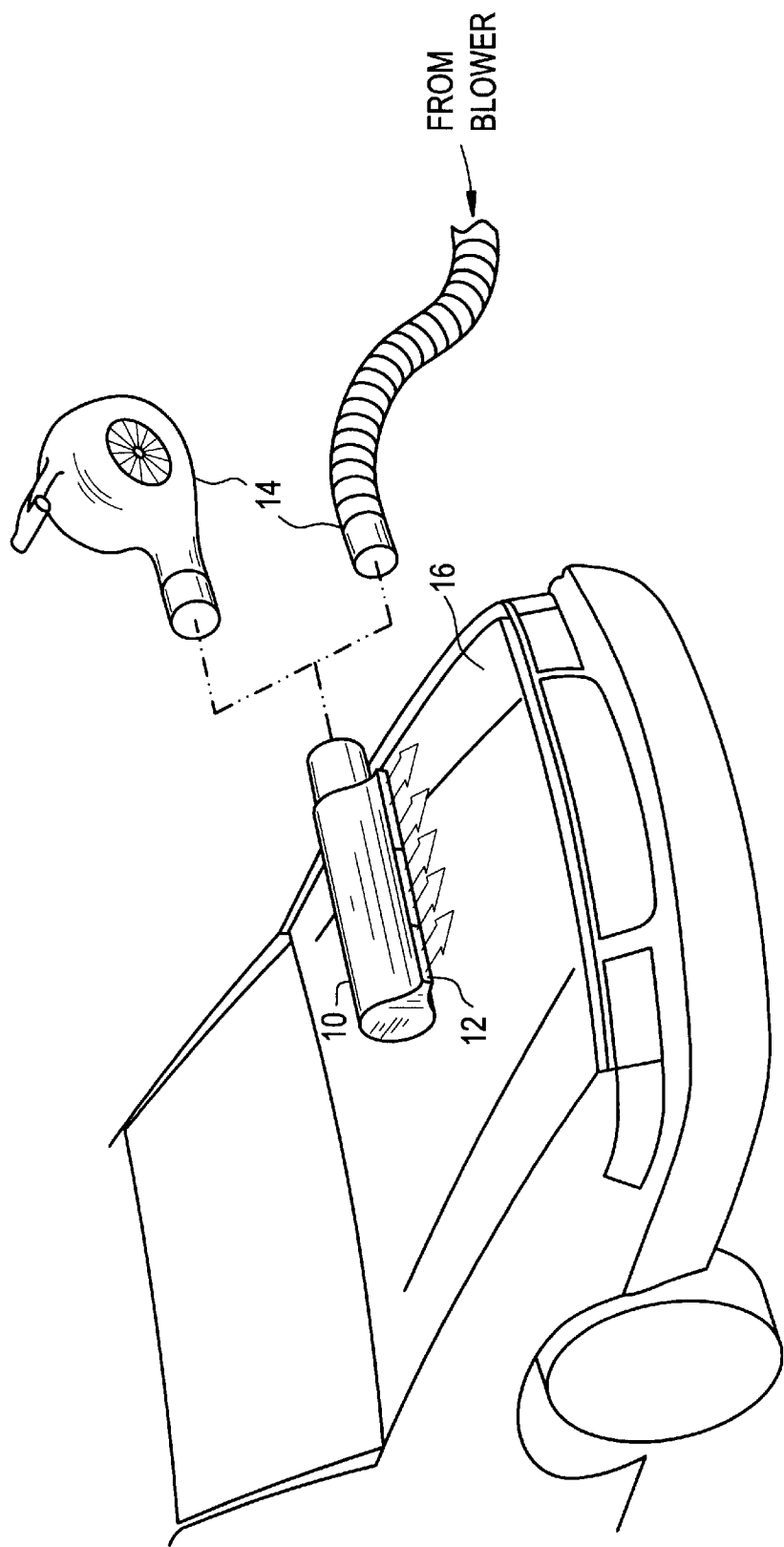
FIG. 1 is a perspective view of the nozzle, as it could be installed on a portable air blower or an air hose, shown in a position representing a typical operation blowing air across the surface of a vehicle in a right-to-left configuration.
Figure 2:
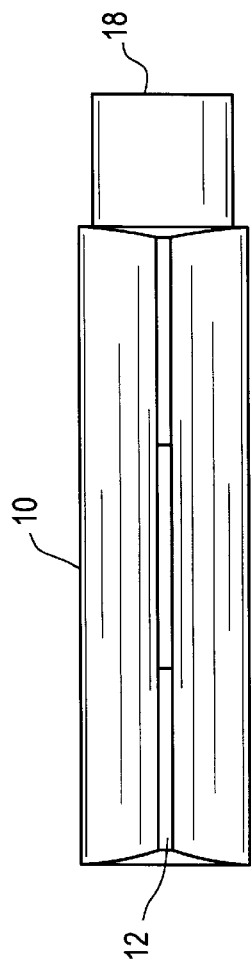
FIG. 2 is a side view of the nozzle alone, illustrating the basic concept, that is a tubular device with a longitudinal outlet gap along the side of the device.
Figure 3:
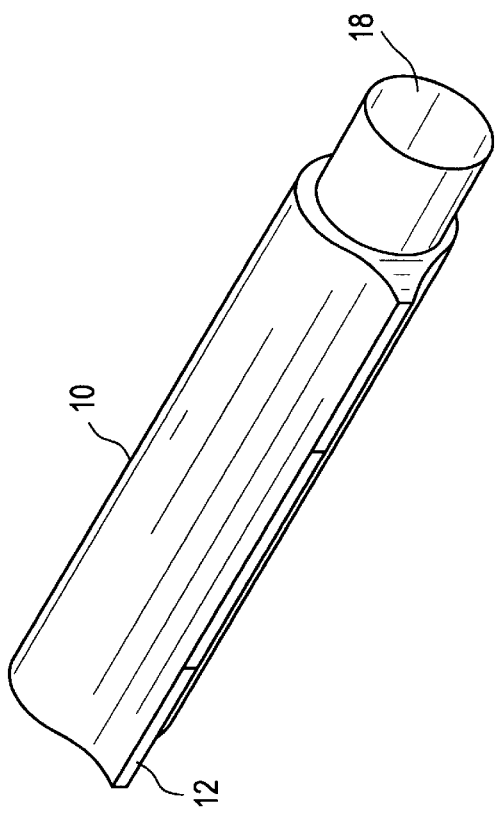
FIG. 3 is a perspective view of the nozzle alone showing the input flange and the longitudinal outlet gap extending most of the length of the nozzle.

As is shown in FIGS. 1 to 3, for purposes of illustration, the present invention is embodied in a blower nozzle, indicated generally by the numeral 10, with a longitudinal air outlet gap 12, for use with an air source 14, which produces a high velocity sheet of air to be directed by the operator onto a surface 16, in order to displace water or other loose matter therefrom. The blower nozzle 10 will be made of a durable lightweight material, such as, but not limited to, a molded plastic or an alloy, so that its weight will not cause unnecessary fatigue to the user. The air source 14 may be a hand held blower powered by an internal combustion engine or by an electric motor. Alternatively, the air source 14 may be a portable or floor mounted blower with an output hose. The flowing air is conducted from the output of the air source 14 into the nozzle 10, creating pressure within the nozzle 10 and, thereby, being forced out through the longitudinal air outlet gap 12 in an even, high velocity sheet onto the surface 16 to be cleared. The complete working assembly consists of the nozzle 10 connected to the air source 14. In order to securely fasten the nozzle to the output of the air source, the input flange 18 of the nozzle will utilize either a friction fit joint, key/slot arrangement or other type of clamping mechanism, depending upon the type of output flange of the air source 14 to be used. Optionally, the nozzle could be molded to a blower housing or otherwise be provided as a permanent portion of an air blower.

In accordance with the present invention, the sheet of air is conducted to the surface to be cleared 16 through the nozzle's air outlet gap 12. As shown in FIG. 1, this is done by holding the nozzle 14 in such a manner that the air outlet gap 12 is parallel to the surface 16 and then slowly moving the assembly along the length of the surface 16 in the same direction as the air flows from the air outlet gap 12. This motion is continued until the water or other loose matter has been blown off the surface 16. It may be necessary to repeat this motion several times to clear the entire surface 16, depending upon the size of the surface 16. The input flange 18 may provide the ability to rotate the nozzle 10 about its longitudinal centerline, allowing the motion described above to be performed in either a left-to-right or a right-to-left fashion.

SUMMARY, RAMIFICATIONS AND SCOPE

It will now be appreciated that, through the use of this invention, the high velocity air produced by the air blower 14 is directed by the blower nozzle 10 through the air outlet gap 12 in a smooth sheet onto the surface 16 to clear any water or other loose matter from the surface 16. This is accomplished without coming into contact with the surface 16 and, thereby, minimizing the risk of damaging the surface, without leaving streaking, and without the need to take time to wring the water from a towel, cloth, chamois or the like.

Although a particular embodiment of the invention is described in detail for the purpose of illustration, various embodiments may be made without departing from the spirit and scope of the invention. Some examples of this are: the nozzle can be of any shape that will allow functionality; the moving air can be provided by any means that will provide adequate air flow from the nozzle output; the length and shape of the air outlet gap can vary provided it remains functional; the invention is not limited to use on motor vehicles, but can be used on any appropriate surface. Accordingly, the scope of the invention should be determined by the appended claims and their legal equivalents, rather than by the example given.

I claim:

1. A drying apparatus comprising:

a hand held hollow tubular nozzle movable over a wet surface by a human operator holding and operating said hand held nozzle;

a high velocity air source connected to said hand held hollow tubular nozzle;

a sheet of air produced by said high velocity air source flowing from said hand held hollow tubular nozzle;

a wet motor vehicle toward which said sheet of air is directed such that drying occurs over an exterior of said wet motor vehicle; and a controllable pattern of air exiting said drying apparatus such that said wet motor vehicle is thoroughly and quickly dried without causing damage to a surface finish of said wet motor vehicle and without leaving streaks on said finish of said wet motor vehicle.

2. The nozzle of claim 1 wherein said nozzle is constructed of a durable lightweight material.

3. The nozzle of claim 1 wherein said nozzle includes an input flange designed to connect directly to the air blower output.

4. The nozzle of claim 1 wherein said nozzle includes an input flange designed to connect through an adapter to the air blower output.

5. The nozzle of claim 1 wherein said nozzle includes an input flange designed to connect through a hose to the air blower output.

6. The nozzle of claim 1 wherein said nozzle is constructed as an integral part of the air blower housing.

\* \* \* \* \*